Dec. 27, 1960  A. B. NEWTON  2,966,342
COMBINATION HEATING AND REFRIGERATION SYSTEM
Filed Sept. 6, 1956  4 Sheets-Sheet 1

INVENTOR:
Alwin B. Newton,
BY Dawson, Tilton & Graham,
ATTORNEYS.

Dec. 27, 1960   A. B. NEWTON   2,966,342
COMBINATION HEATING AND REFRIGERATION SYSTEM
Filed Sept. 6, 1956   4 Sheets-Sheet 3

INVENTOR:
Alwin B. Newton,
BY Dawson Tilton & Graham
ATTORNEYS.

Dec. 27, 1960     A. B. NEWTON     2,966,342
COMBINATION HEATING AND REFRIGERATION SYSTEM
Filed Sept. 6, 1956     4 Sheets-Sheet 4

Fig.6

INVENTOR:
Alwin B. Newton,
BY Dawson, Tilton & Graham,
ATTORNEYS.

United States Patent Office 2,966,342
Patented Dec. 27, 1960

2,966,342

COMBINATION HEATING AND REFRIGERATION SYSTEM

Alwin B. Newton, Wichita, Kans., assignor to The Coleman Company, Inc., Wichita, Kans., a corporation of Kansas Filed Sept. 6, 1956, Ser. No. 608,287

8 Claims. (Cl. 257—282)

This invention relates to a combination heating and refrigeration system, and more particularly to a combination heating and refrigeration system for providing easy and convenient change-overs between a heated air distribution balance and a proportionately-different cooled air distribution balance, the change-overs being effected automatically or semi-automatically. The system of this invention will probably have its greatest utility in providing central heating and refrigeration plants for dwelling houses, but the system can also be advantageously employed in other buildings having a plurality of rooms, at least some rooms of which require different proportions of the total cooled air than the heated air and/or have a considerably greater cooled air requirement in summer than their heated air requirement in winter.

The desirability of providing a combination heating and refrigeration system which would supply both heated air requirements in winter and cooled air requirements in summer has long been recognized, and a number of systems of this type are now commercially available. When the heating and cooling is supplied by a given volume of air flow, however, the variation between the heating and cooling loads and the required proportions of either for distribution to the various rooms of the building creates a serious problem, which heretofore has not adequately been solved. To make this somewhat more specific, the heated air requirement of any particular room may differ considerably from the cooled air requirement, although certain rooms may have a more nearly balanced heated and cooled air requirement. For example, a room having a southwest exposure would in general tend to have a higher proportionate cooling load, as compared with its relatively lower proportion of the heating load. Similarly, certain rooms require less heat and more cooling because of the uses made of the rooms, and this is especially true of kitchens. Thus, it can be seen that there is a considerable problem of summer versus winter air distribution between the various rooms of a house, and this has presented many practical difficulties. Also, because of the practical limits on air delivery temperatures, the cooling cycle usually requires a much larger total volume of air than the heating cycle.

One partial solution to the problem just discussed is to provide for a variation in air distribution by the use of a number of manually-operated dampers in the air handling and distribution system. By adjustment of the various dampers, relatively more or less air can be supplied to the rooms, in order to compensate for proportionately greater cooling air requirement as compared to a heating air requirement, or vice versa. Likewise the relative proportions of heated air and of cooled air could be adjusted for each room by manual dampers. While satisfactory adjustments can many times be made in this manner, such a solution to the problems imposes hardships on the home owner, who must make the required adjustments manually, and this is particularly troublesome in the spring and fall during which periods damper adjustments may be required several dozens of times. Also, there is a considerable likelihood that the adjustments will not be made properly, and that therefore a good balance in the air distribution will not be obtained during either the heating or cooling periods of the year.

The problems just discussed tend to be particularly acute in the southern part of the United States. This is true because the climate there is such that the total cooling air requirement for all rooms of the house will normally far exceed their total heating air requirements. Consequently, if a combination air handling unit is installed with adequate capacity to supply all the air needed for the cooling air requirements, during the heating season the unit must be operated at considerably below its optimum capacity. Such an oversize heating system is difficult to control, so that the system tends to vary in its efficiency and its ability to maintain the desired air temperatures in the various rooms. Ideally, the heating unit should have just enough capacity for heating the rooms during the coldest portions of the winter and must deliver its heated air at a sufficiently high temperature for comfort, but heretofore no way has been provided of accomplishing this objective while at the same time employing the system for meeting the cooling needs during the hottest portion of the summer.

It is therefore a general object of this invention to provide a combination heating and refrigeration system which substantially overcomes the problems and difficulties just discussed. More specifically, it is an object to provide such a system which automatically compensates for the proportionate and/or volumetric variation between the average or balanced heated air and cooled air requirements of the various rooms of a house or other building. Still another object is to provide a system of the character described which functions well in the southern part of the United States or other areas where the normal total cooled air requirements far exceed the normal total heated air requirements. Further objects and advantages will appear as the specification proceeds.

This application is a continuation-in-part of application Serial No. 485,926 filed February 3, 1955, now abandoned.

This invention is shown in illustrative embodiments in the accompanying drawing, in which—

As already indicated, the present invention is particularly concerned with a combination heating and refrigeration system which is capable of providing automatic-changeovers between a heated air distribution balance and a proportionately-different cooled air distribution balance. The practice of "balancing" in connection with central warm air heating systems is well known. The problem of "balancing" a combination heating and refrigeration system, however, has not heretofore received any adequate consideration. There is, in fact, a serious problem in connection with the "balancing" of such a combination system which is believed to have been first recognized in connection with the making of the present invention.

In designing and installing central warm air heating systems, the engineer must first determine the total volume of air required to heat all rooms. This will determine the basic capacity of the hot air handling unit, which will primarily be determined by the c.f.m. rating of the blower. It is after this stage that the problem of "balancing" can be said to arise. In other words, the engineer must now determine how the total volume of heated air is to be distributed, that is, in what proportions, to the various rooms. The size and number of ducts to the rooms can be relied upon to give a rough proportioning, the final adjustments being made by means of throttling dampers in the ducts.

It might be thought that the volume of heated air required by any given room would be largely determined by the size of the room. Although the size or interior volume of the room, of course, is an important factor, it is rather certain variable factors that provide the main difficulties. For example, in the winter the prevailing wind direction and velocity markedly affect the proportions of the heated air required by various rooms. In addition to this wind effect, there is an exposure effect; e.g., the rooms with a northern exposure require a greater proportion of the heated air than the rooms with a southern exposure, as to a lesser extent do the rooms with an eastern or western exposure, and the window areas of the various rooms may accentuate the difference due to exposure to the sun. There is also an internal load effect based on the use to which particular rooms are put, such as the various functions carried on in a kitchen which result in the addition of heat to the room, and therefore reduce the proportion of heated air required in the kitchen.

All of the effects just mentioned and others related thereto can be adequately taken into consideration for practical purposes by adjusting the dampers in the ducts of a hot air heating system to provide an air distribution pattern where the relative proportions of heated air received by each room are such that the rooms are properly and generally approximately uniformly heated on an average winter day. An unforeseen difficulty, however, arises when it is desired to use the same basic air handling unit and duct distribution system for cooling in summer that was used for heating in winter. In connection with the making of the present invention, it was discovered that the use of the same air handling unit and duct distribution arrangement for cooling as for heating was unsatisfactory for at least two basic reasons.

It turns out that in most parts of the United States, particularly the central and southern parts, that the total volume of air required for cooling a house in the summer is considerably greater than the volume required for heating the house in winter. This volumetric unbalance tends to be greater in areas of the country where the winters are relatively mild and of short duration while the summers are relatively hot and of longer durations, which would include most of the southern States. Consequently, if the same air handling unit and duct system is to be employed in both summer and winter, it is necessary to use a system which is overrated in terms of c.f.m. capacity for the average heating load in order to meet the average cooling load. This is all right for the portion of the year in which cooling is used, but it does not lead to comfort heating for the rest of the year. In order to do the same amount of heating with a larger volume of air than necessary, it is necessary to heat the air to a lower temperature, which results in undesirable drafts.

The other problem in attempting to use the same air handling unit and duct system for both heating and cooling is one of air distribution proportions as distinguished from the problem with regard to the total volume of air just discussed. It might have been thought that there would be some minor variations in the desirable proportions between the heating and cooling distribution patterns, but it turns out that the proportions are widely different, and must therefore be taken into consideration if a central system is to provide both comfort heating and comfort cooling. The full theoretical explanation of this marked difference has not as yet been worked out, but analytical and experimental work in connection with the present invention has indicated a number of the factors which are involved.

It has been found that in the summer, the "wind effect" practically cancels out. This is apparently true because there are less prevailing winds in summer and the winds are generally of lower velocity than in winter. Further, there is less temperature difference between the inside and the outside of the house. Consequently, those rooms which required proportionately more heating in winter because of the "wind effect" probably will not require proportionately more cooling in summer for this reason.

On the other hand, the "exposure effect" and the "internal load effect" previously discussed in connection with the heating situation, tend to reverse their relationship to the desired air distribution in summer. For example, the rooms with a northern exposure which required more heating in winter and therefore a greater proportion of the total volume of heated air, require less cooling in summer and therefore a lesser proportion of the total volume of cooled air. Similarly, the rooms which are particularly susceptible to the internal load effect, such as the kitchen, require more cooling in summer whereas they required less heating in winter. In fact, it appears that the internal load factors which are usually considered under this heading always tend to require less heating in winter because they result in the addition of heat to the room, and therefore would always tend to require more cooling in summer to offset the added heat.

Another common situation is that of a two-story house. Although this has not been completely worked out as yet, it is found that the relationship of the first and second story rooms is such as to tend to magnify the change in relative proportions between heating and cooling loads.

Figures 1, 2:
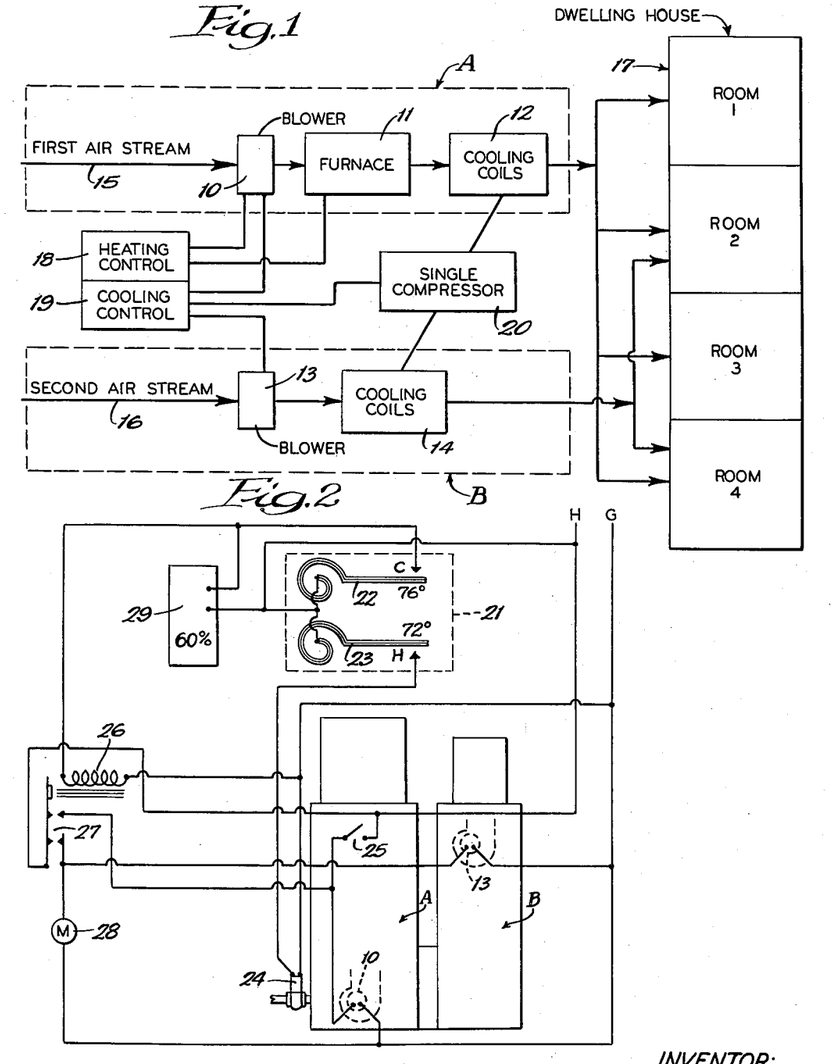
Fig. 1 is a schematic illustration of a combination heating and refrigeration system embodying the principles and capable of accomplishing the new results of this invention.
Fig. 2, a somewhat schematic circuit diagram, illustrating the type of electric circuit which it is desired to employ in the combination heating and refrigeration system of the present invention.

The means of solving the problems just described are illustrated diagrammatically in Fig. 1. The overall system, which is a combination heating and refrigeration system, can be regarded as composed of two air handling units, being enclosed by dotted lines, and designated respectively by the letters A and B. Unit A includes a blower 10, a furnace 11, and cooling coils 12, while unit B includes a blower 13 and cooling coils 14. Separate air streams are employed by each of the units, such as air stream 15, designated as the first air stream in Fig. 1, and air stream 16, designated as the second air stream in the same figure. The air in stream 15, which is handled by unit A, passes through blower 10, furnace 11, over cooling coils 12, and is distributed through a suitable duct system to each of the rooms of the dwelling house 17, being rooms 1–4 in the illustration given. The air in stream 16, which is handled by unit B, passes through blower 13, over cooling coils 14, and is distributed through a duct system to some of the same rooms of dwelling house 17, being rooms 2 and 4 in the illustration given.

The combination heating and refrigeration system of Fig. 1 also includes a heating control 18, a cooling control 19, and a compressor 20. The heating control is connected to blower 10 and furnace 11, while the cooling control is connected to both blowers 10 and 13 and to compressor 20.

In the operation of the system for heating, unit B would not participate. Heating control 18 will operate blower 10 and furnace 11 in the usual way to maintain the desired winter temperature, for example, 72°. Balancing dampers in each of the heated air distribution ducts are adjusted in the normal manner to establish the desired proportions of heated air required for each of the rooms 1 to 4 (for example) and thus to balance the flow for uniform winter temperature. When the temperature within the dwelling rises to the summer control temperature, for example 76°, cooling control 19 actuates blowers 10 and 13 and compressor 20 which supplies cooling fluid to cooling coils 12 and 14. The air of stream 15 is passed by means of blower 10 over cooling coils 12 and distributed through the same duct system used for heating, and in the same quantities and proportions as for heating to the rooms of the dwelling house. At the same time, the air in stream 16 is passed by means of blower 13 over cooling coils 14 and distributed to rooms 2 and 4. Dampers in ducts leading to rooms 2 and 4 can be adjusted so that the total air received by rooms 2 and 4 is the correct total required and is provided in the correct total proportions which will both be different than when heated air is supplied through stream 15 only. As will subsequently be explained in greater detail, this provides a means for supplying a greater total volume of cooled air than of hot air to the dwelling house and of supplying the cooled air in different proportions. All this can be achieved without using an air handling unit for heating which has a greater c.f.m. capacity than that required for heating, and the change-overs from the heating cycle to the cooling cycle are automatically obtained without any manual resetting of dampers or other manual adjustments being required. The automatic change-over feature is of particular importance during the spring and fall, since during these seasons for maximum comfort it may be necessary to change from heating to cooling and vice versa several dozens of times. The system just described also has the advantage that it permits a single compressor to be used for supplying the cooling coils of both of the air handling units.

The operation of combination refrigeration and heating systems constructed in accordance with this invention will now be further described in connection with the circuit diagram of Fig. 2. It will be understood that the blowers, compressor and furnace heretofore referred to are preferably adapted for electrical actuation, and such an arrangement is assumed in the circuit diagram of Fig. 2. In the illustration given, there is shown an electrical control means 21, which will be positioned at a central location in the house, so as to function as the main control of the system. Control means 21 provides two thermostat control means in the form of circuit-closing contacts 22 and 23 which are adapted to operate at different temperatures, as selected. For example, the lower contact 23 will be a temperature fall control and may be set to close when the temperature drops below 72° F., while the upper contact 22 will be a temperature rise control and may be set to close when the temperature rises above 76° F. As shown, contacts 22 and 23 are connected in parallel to a source of current supply indicated by H.

When the temperature drops below the setting of contact 23, electrical current is passed to a solenoid valve 24 which opens to admit gas or oil to the burner within air handling unit A. After the temperature within heating chamber of the furnace of unit A has increased to a predetermined level, thermally-responsive switch 25 closes, thereby starting main unit blower 10 and beginning the distribution of heated air to the rooms of the building.

The converse of the circuit actuation sequence just described occurs automatically when the temperature rises above 72° F. by a predetermined amount. Specifically, contact 23 opens, which de-energizes solenoid valve 24, thereby closing the fuel supply valve to burner. Then after the temperature within the heating chamber has fallen to a predetermined level, thermal-responsive switch 25 opens, shutting off blower 10. This completes the normal cycle of operation of the furnace during the winter months.

In the summer months, the temperature will rise above 76° F. or whatever setting has been selected for contact 22, and this will cause the upper temperature contact to close, thereby energizing relay coil 26, which in turn closes magnetically operated switch 27. The closing of switch 27 supplies current to the motor 28 of the compressor or cooling unit so that cooling fluid will be circulated through cooling coils of both units A and B. Also, current is supplied to both blowers 10 and 13. The relay comprising coil 26 and switch 27 is a double pole, single throw, normally open relay.

Another problem frequently encountered in the complete air conditioning of homes, is that of high humidity. To correct excessive humidity conditions, there is provided in the circuit of Fig. 2 a humidistat 29 which is connected in parallel across the high temperature contact of control 21 so that it will independently actuate both units A and B in the manner previously described for the closing of contact 22. For example, humidistat 29 may be set to close the circuit to relay 26 when the relative humidity exceeds 60%. This will cause air from the rooms (through a return air duct or ducts) to be circulated over both cooling coils 12 and 14, thereby condensing moisture from the air on these cooling coils and achieving a reduction in the humidity of the air returned to the rooms through the distribution ducts associated with units A and B. The principal advantage of the combined air handling units occurs, however, under conditions when the humidity is relatively high and the temperature is relatively low. With this type of condition, it would be undesirable to further cool the air for the purpose of removing moisture, since the room air temperature is already too low. The control system shown in Fig. 2, however, automatically compensates for the reduction in air temperature in the following way. The high humidity condition will cause humidistat unit 29 to start the cooling functions of both unit A and unit B, but whenever the room temperature falls below the setting of contact 23, say 72° F., the heating function of unit A will also be brought into play. In this way, the air temperature can be maintained between 72 and 76° F., for example, while at the same time reducing the relative humidity of the air, and this may be desirable in either summer or winter. Moreover, the increments of heated air (in connection with the reheat function) will be automatically distributed according to the pre-established heated air distribution balance, while at the same time the increments of cooled air (from both units A and B) will be distributed according to the pre-established cooled air distribution balance. This is an important advantage since in order to obtain an overall balance in the rooms being supplied with air, for reasons previously described, cooled air must be distributed according to one pattern while heated air must be distributed according to another pattern, but the proper heating balance and the proper cooling balance are both maintained simultaneously during the reheat function.

Figure 3:
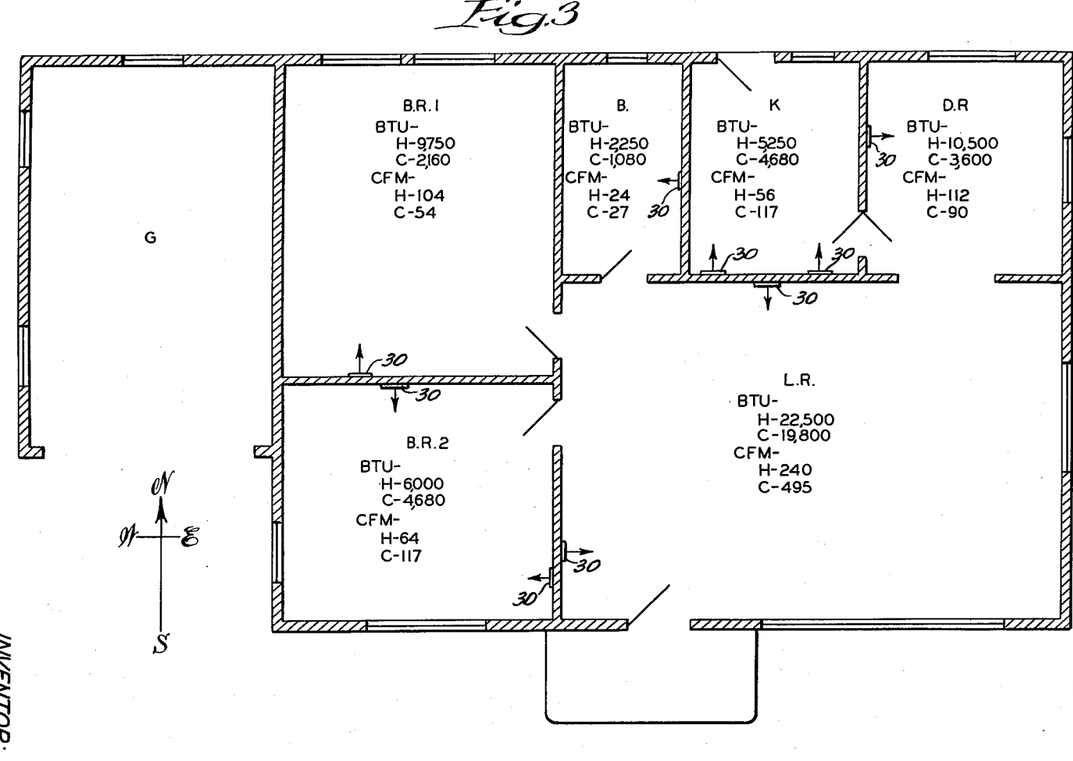
Fig. 3, a diagrammatic plan view of a house floor plan illustrating the varying heating and cooling requirements of the rooms and the manner of meeting these requirements in accordance with the present invention.

Fig. 3 shows a typical house plan, consisting of a living room, dining room, kitchen, bath room, and two bedrooms. The figures following the letters H and C in each room under the heading B.t.u. represent the approximate normal heating and cooling requirements of these rooms in B.t.u.'s per hour, the heating requirements applying to the winter season and the cooling requirements to the summer season. Using these figures the relative heating and cooling loads can be calculated as set out below in Table I.

*Table I*

| Rooms | Percent of Heating Load | Percent of Cooling Load |
|---|---|---|
| L R | 40 | 55 |
| D R | 18.6 | 10 |
| K | 9.3 | 13 |
| Ba | 4.1 | 3 |
| Br 1 | 17.3 | 6 |
| Br 2 | 10.7 | 13 |
| | 100.0 | 100.0 |

Assuming that a heating capacity of 600 c.f.m. is required, and a cooling capacity of 900 c.f.m., the relative heated and cooled air distributions can be calculated from the above percentages as set out in Table II.

*Table II*

| Rooms | Heated Air (c.f.m.) | Cooled Air (c.f.m.) |
|---|---|---|
| L R | 240 | 495 |
| D R | 112 | 90 |
| K | 56 | 117 |
| Ba | 24 | 27 |
| Br 1 | 104 | 54 |
| Br 2 | 64 | 117 |
| | 600 | 900 |

On the basis just calculated, applicant's invention would be applied by installing a main air handling unit of the character described having a rated capacity of 600 c.f.m. The associated ducts and dampers would be constructed and arranged to deliver heated air to the rooms in the proportions set out in the second column of Table II. Also, an auxiliary air handling unit of the character described having a rated capacity of 300 c.f.m. would be installed. However, ducts from the auxiliary unit would only be run to the living-room, kitchen, and second bedroom, because the cooled air requirements of the other rooms is either about the same or less than their heated requirements. The ducts and associated dampers from the auxiliary unit would be designed to deliver approximately the difference between the c.f.m. values in the third column of Table II and the second column for living-room, kitchen, and second bedroom. Thus, achieving the cooled air distribution summarized in Table III.

*Table III*

| Rooms | Cooling Air Distribution (c.f.m.) | | |
|---|---|---|---|
| | From Main Unit | From Aux. | Total |
| L R | 240 | 200 | 440 |
| D R | 112 | | 112 |
| K | 56 | 50 | 106 |
| Ba | 24 | | 24 |
| Br 1 | 104 | | 104 |
| Br 2 | 64 | 50 | 114 |
| | 600 | 300 | 900 |

It can be seen from Table III that the total cooled air distributed to each room rather closely approximates the ideal figures of the third column in Table II. The approach to the ideal of the third column of Table II is sufficiently close to provide an entirely practical system.

Referring more particularly to Fig. 3, the air outlets are designated by the number 30. It will be noted that the living-room, kitchen, and second bedroom each have two of the outlets 30, while the dining room, bathroom, and first bedroom have only one of the outlets. One outlet in each of the rooms will be supplied with air from a duct extending from the main air handling unit, which may be like unit A previously described. The second of the outlets in the living-room, kitchen, and second bedroom will be supplied with air from ducts extending from the auxiliary unit, such as unit B described above. In this particular illustration, unit A has a considerably larger air capacity than unit B, but in certain areas of the United States, the c.f.m. capacity of the second unit may be larger than that of the first unit. Also, in certain applications, it may be desirable to employ more than one unit, such as unit B, and having only an air cooling means therein. Normally, however, the proper air distribution patterns for both heating and cooling can be obtained using one air handling unit containing both a heating and cooling means, and another air handling unit containing only cooling means. In dwellings of two story construction, a separate unit such as B may be employed to provide extra cooling and a greater proportion of air for all second floor rooms to overcome the usual problem of insufficient cooling of such second floor locations.

Figure 4:
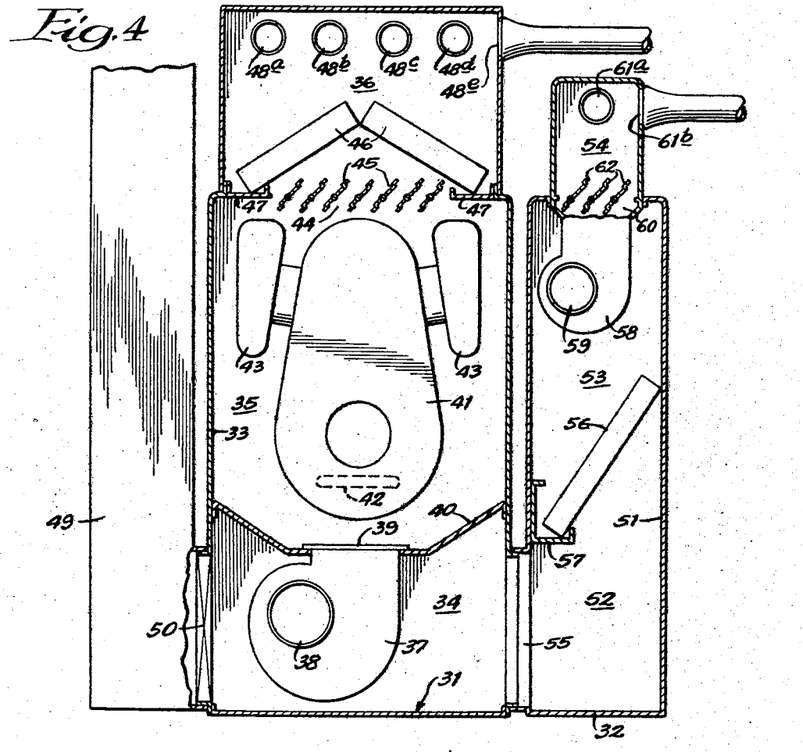
Fig. 4, a vertical sectional view of an air handling apparatus which can be used advantageously in connection with the present invention.

Fig. 4 illustrates a central air handling plant which can be used in practicing the present invention. The plant includes a first or main handling unit 31, and a second or auxiliary air handling unit 32. In the illustration given, main unit 31 consists of a casing 33 providing an air intake chamber 34 and thereabove a heating chamber 35, and above the heating chamber a plenum chamber 36. Within intake chamber 34 there is mounted a motor-driven blower 37 having an air intake 38 within the chamber and discharging air through an outlet 39 into heating chamber 35, these two chambers being separated by partition wall 40.

Figure 5:
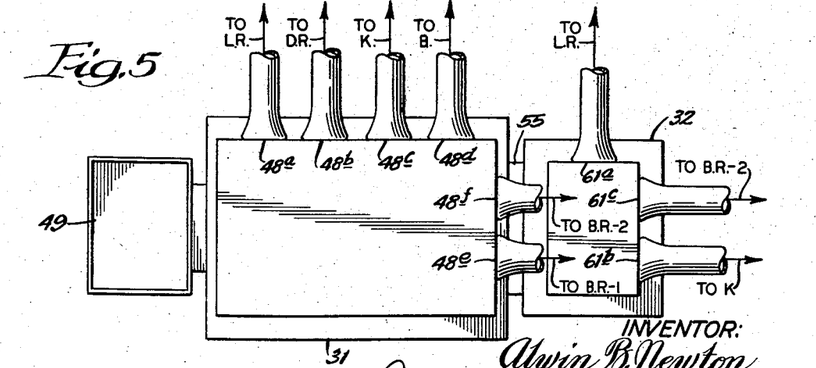
Fig. 5, a top plan view of the air handling apparatus of Fig. 4.

Within heating chamber 35 there is disposed a heater casing 41 in which is mounted a burner 42, and the products of combustion within the casing 41 pass through various radiation casing members 43 and finally are discharged through an outlet pipe (not shown). Chamber 35 communicates with chamber 36 through a passage 44 which can be controlled by a plurality of proportioning dampers or valve louvers 45, although these dampers can be omitted. Above passage 44 are mounted cooling coils 46 having their lower ends resting within condensate channels 47. A cooling fluid may be supplied to cooling coils 46 from a compressor and cooling unit (not shown), but which would form part of the complete air conditioning system, and which is preferably a single compressor as previously described. The plenum chamber 36 is provided with the usual outlet ducts or conduits 48a to 48f leading to outlets in the various rooms of the building, and preferably to all of the rooms of the building even though the rooms have varying heating and cooling requirements. For example, as shown in Fig. 5, the ducts can be connected to the rooms illustrated in the house of Fig. 3 in the following way: Duct 48a to the living room, duct 48b to the dining room, duct 48c to the kitchen, duct 48d to the bath room, duct 48e to the first bedroom, and duct 48f to the second bedroom.

In combination with unit 31, there is preferably provided a return air pipe 49 communicating at its lower end through a filter unit 50 with air intake chamber 34. Preferably, branch conduits or ducts extend from return air pipe 49 to all of the rooms of the building to provide for continuous air flow and circulation through all the rooms, although some of the smaller rooms which are normally open to the larger rooms may not require a direct air return connection.

In the illustration of Fig. 4, the auxiliary air handling unit 32 consists of a casing 51 extending vertically and parallel to casing 33 on main unit 31 and communicating at its lower end portion with the air intake chamber 34 of the main unit. Within casing 51 there is provided an air intake chamber 52, an air cooling chamber 53, and a plenum chamber 54. By means of a connecting passage 55, air intake chambers 34 and 52 of the two air connected space extending from the point of discharge handling units are in effect one chamber, and provide a connected space extending from the point of discharge of the air return duct 49 across the lower portion of both units. If desired, however, the air handling units may be physically separated and may have entirely separate return air ducts.

Within the cooling chamber 53 of auxiliary unit 32, there is provided an auxiliary cooling unit 56, which can consist of cooling coils similar to cooling coils 46 in main unit 31, and connected in circuit with the same compressor and cooling unit. An L-shaped bracket 57 provides a support for cooling coils 56 and also provides a condensate receptacle. Mounted in the upper portion of chamber 53 is a motor-driven blower 58 having an inlet 59 communicating with chamber 53 and an outlet 60 communicating with plenum chamber 54. Extending from plenum chamber 54 there is provided a plurality of air distribution ducts 61a to 61c, which are preferably connected only to those rooms which have a proportionately or volumetrically greater cooling air requirement in summer than their heating air requirement in winter. For example, as shown in Fig. 5, the ducts from the auxiliary unit 32 can be connected to the rooms of the house illustrated in Fig. 3 as follows: Duct 61a to the living-room, duct 61b to the kitchen, and duct 61c to the second bedroom. Between chambers 53 and 54 there is provided a series of check dampers or louvers 62, which are adapted to prevent the backflow of air from chamber 54 into chamber 53, as might occur when unit 31 is operated without the operation of unit 32, though these dampers may frequently be eliminated without detriment to the operation of the system.

It will be understood that normally quadrant dampers in each run from each air stream will be included so that the actual c.f.m. requirements dictated by Fig. 3 can be approximately obtained in the initial manual adjustments of the system for both the optimum heating and cooling balances.

Figure 6:
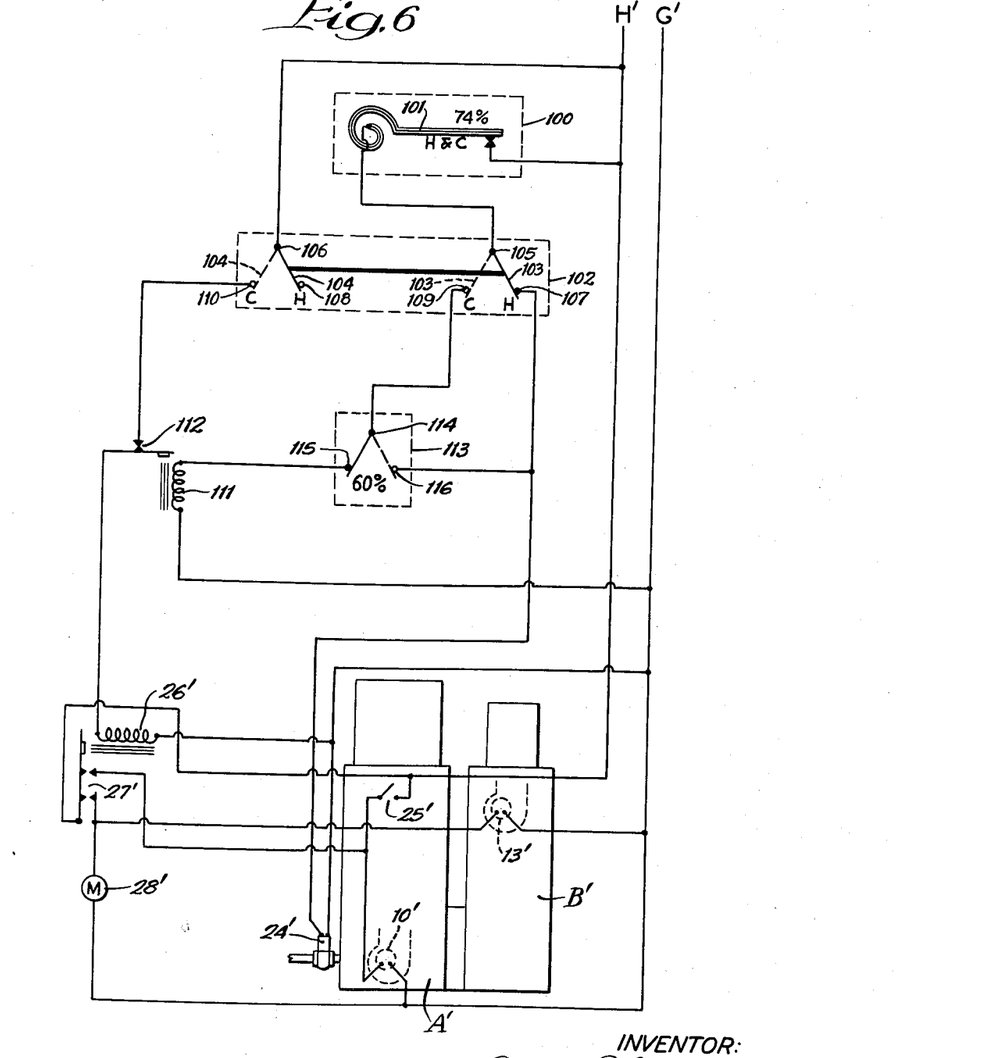
Fig. 6, a modified circuit diagram.

Fig. 6 illustrates a modified circuit diagram which can be used for controlling the combination heating and refrigeration system of this invention while obtaining substantially all of the advantages and new results previously described. In this variation, a single thermostat having one contact is employed for both the heating and cooling cycles in combination with a manual switch for alternating between the automatically balanced heating and cooling cycles. Dehumidification through reheat can also be included. This modified circuit will now be described in greater detail.

Looking at the circuit diagram of Fig. 6, it will be noted that the units and components which are the same as those shown in the circuit diagram of Fig. 3, have been given the same numbers except that the numbers have been primed. The thermostat 100 contains only one circuit-closing contact 101. This thermostat can be used for both the heating and cooling cycles. For example, it can be set to close contact 101 on a temperature fall to 74° F. Conversely, the contact 101 will open on a temperature above 74° F. The contact 101 is shown closed as it would appear during the heating cycle.

The modified circuit also includes a manually operable switch 102, which in the illustration given, is a double pole, double throw switch. This switch has movable blades 103 and 104 which are respectively connected to terminals 105 and 106. In one of the manually selectable positions, which is that which would be employed for the heating cycle, blade 103 makes contact between terminal 105 and 107, while blade 104 makes contact between terminal 106 and 108. In the alternate position for the cooling cycle, as indicated by the dotted positions of blades 103 and 104, these blades respectively make contacts with terminals 109 and 110.

When manual switch 102 is set to actuate the heating cycle, the position of blades 103 and 104, being as illustrated in Fig. 6, the operation of the system is as follows. Contact 101 of thermostat 100 closes on a temperature fall to 74° F. (or other selected temperature). The current then passes through the thermostat contact to switch terminal 105, through blade 103 to terminal 107, and then to solenoid valve 24' which opens to admit gas or oil to the burner within air handling unit A', as previously described in connection with the circuit diagram of Fig. 2. Similarly, after the temperature within the heating chamber furnace unit A' has increased to a predetermined level, thermally-responsive switch 25' closes, thereby starting main unit blower 10' and beginning the distribution of heated air to the rooms of the building. When the temperature rises above 74° F. by a predetermined amount, thermostat contact 101 opens which de-energizes solenoid valve 24' and thereby closing the fuel supply valve to the burner. Then after the temperature within the heating chamber has fallen to a predetermined level, thermally-responsive switch 25' opens, shutting off blower 10'. As previously described in connection with the circuit diagram of Fig. 2, this completes the normal cycle of operation of the furnace during the winter months.

Whenever it is desired to employ the cooling cycle with the different air distribution balance for this cycle, it is only necessary to shift the position of switch 102 so that blade 103 is in contact with terminal 109 and blade 106 is in contact with terminal 110. When the temperature rises above 74° F. (for example), the thermostat contact 101 will open. This institutes a demand for cooling in the following way. During the heating cycle, relay coil 111 receives no current, and thus switch 112 remains closed, this being its normal position. During the cooling cycle, however, prior to the opening of thermostat contact 101, current passes through relay coil 111, the current passing from switch terminal 109 through the single pole, double throw switch within humidistat 113, which unless the humidity is high as will subsequently be explained, automatically forms a contact between humidistat terminal 114 and humidistat terminal 115, the latter terminal being connected to relay 111. On the opening of thermostat contact 101 which will occur during the cooling cycle when the room temperature is above 74° F. (or other selected temperature), the flow of current through relay 111 terminates, and this permits switch 111 to assume its normal closed position. Current then flows through switch terminal 106, blade 104, terminal 110, switch 112, and through relay coil 26'. With the energizing of relay coil 26', switch 27' is closed, and the closing of this switch supplies current to motor 28' of the compressor or cooling unit so that cooling fluid will be circulated through the cooling coils of both units A' and B'. Also, current is supplied to both blowers 10' and 13'. As previously described, the relay comprising coil 26' and switch 27' is a double pole, single throw, normally open relay. This compares with the relay comprising coil 111 and switch 112 which is a single pole, single throw, normally closed relay.

When the room temperature drops to 74° F. due to the correctly proportioned cooled air supplied thereto, thermostat contact 101 closes and this again energizes relay coil 111, which opens switch 112 in the manner previously described. This interrupts the flow of current to relay 26' and this opens switch 27', thereby stopping compressor motor 28' and the unit blowers 10' and 13'.

Since there will normally be no occasion for dehumidification during the heating cycle, humidistat 113 is out of the circuit during this cycle. During the cooling cycle, however, dehumidification may be rather frequently required. For example, humidistat 113 may be set to maintain a relative humidity of 60% or less. When the relative humidity rises above 60% during the cooling cycle, the switch within the humidistat, as operated by a suitable moisture-responsive element, breaks the contact between terminals 114 and 115 and makes contact between terminals 114 and 116. This permits the cooling and heating cycles to operate simultaneously, the heated and cooled air being automatically distributed according to the optimum proportions, as previously described. More specifically, current will flow from switch terminal 109 through humidistat terminals 114 and 116 to the solenoid-operated valve 24' which will open as previously described to supply fuel to the furnace burner of unit A. This will start the furnace and provide the necessary reheat. At the same time, switch 112 will be closed and thus compressor motor 28' and blowers 10' and 13' will be in operation. This combined heating and cooling will result in dehumidification of the air without unduly lowering the air temperature. When the humidity has been reduced to below 60%, the switch within humidistat 113 will break the contact to terminal 116 and form contact with terminal 115. This automatically terminates the flow of current to solenoid-operated valve 24', thereby closing the fuel supply valve. At the same time, current is passed through relay coil 111 which opens switch 112 and de-energizes relay coil 26', thereby opening switch 27' and stopping the supply of current from this switch to motor 28' and blowers 10' and 13'.

While in the foregoing specification this invention has been described in relation to specific embodiments thereof and many details have been set forth for purpose of illustration, it will be apparent to those skilled in the art that the invention is susceptible to other embodiments and that many of the details set forth herein can be varied widely without departing from the basic concepts of the invention.

I claim:

1. A combination heating and refrigeration system for providing easy change-overs between a heated air distribution balance and a proportionately-different cooled air distribution balance, comprising a first air handling unit including a blower means, an air heating means, and an air cooling means, a second air handling unit without any air heating means but including a blower means and an air cooling means separate from the said blower means and the said air cooling means associated with said first air handling unit, duct means for distributing the air from said first unit to a plurality of the rooms of a building, other duct means for distributing the air from said second unit to at least some of the same rooms of said building, said first unit heating means and said first and second blower means and cooling means being adapted for electrical actuation, control means adapted to be located in one of said rooms of said building, said control means including thermostat means having a circuit-closing contact actuated by a predetermined temperature fall, said control means also including another circuit-closing contact actuated by a predetermined temperature rise, and electrical circuits associated with said control means and said first and second air handling units, said circuits being arranged to actuate said first unit blower and said first unit heating means in response to the temperature fall contact of said control means without actuating said second unit blower means and without actuating said first and second unit cooling means, said circuits also being arranged to actuate said first unit blower means and cooling means together with said second unit blower means and cooling means in response to the temperature rise contact of said control means without actuating said first unit heating means, whereby said system can be separately balanced for the proportionately-different heating and cooling requirements of the rooms of said building, and thereafter the respective distribution balances for heating and cooling will be automatically obtained.

2. The combination heating and refrigeration system of claim 1 wherein there is also provided humidistat means connected in parallel across the temperature rise contact of said control means for actuating said first unit and said second unit blower means and cooling means in response to a predetermined humidity rise so that under conditions in said building of relative high humidity and relatively low temperature said first unit heating means and said first and second cooling means may all participate in the overall operating cycle, whereby, when said participation occurs, the increments of heated air are automatically distributed according to the pre-established heated air distribution balance while at the same time the increments of cooled air are automatically distributed according to the pre-established cooled air distribution balance.

3. A combination heating and refrigeration system for providing easy change-overs between a heated air distribution balance and a proportionately-different cooled air distribution balance, comprising a first air handling unit including a blower means, an air heating means, and an air cooling means, a second air handling unit without any air heating means but including a blower means and an air cooling means separate from the said blower means and the said air cooling means associated with said first air handling unit, duct means for distributing the air from said first unit to a plurality of the rooms of a building, other duct means for distributing the air from said second unit to at least some of the same rooms of said building, said first unit heating means and said first and second blower means and cooling means being adapted for electrical actuation, control means adapted to be located in one of said rooms of said building, said control means including thermostat means having at least one circuit contact actuated at a predetermined temperature level, and electrical circuits associated with said control means and said first and second air handling units, said circuits being arranged to actuate said first unit blower and said first unit heating means in response to a temperature fall in relation to said predetermined temperature level without actuating said second unit blower means and without actuating said first and second unit cooling means, said circuits also being arranged to actuate said first unit blower means and cooling means together with said second unit blower means and cooling means in response to a temperature rise in relation to said predetermined temperature level without actuating said first unit heating means.

4. The combination heating and refrigeration system of claim 3 wherein there is also provided humidistat means for actuating said first unit and said second unit blower means and cooling means in response to a humidity rise to a predetermined level so that under conditions in said building of relative high humidity and relatively low temperature said first unit heating means and said first and second cooling means will all participate in the overall operating cycle.

5. The combination heating and refrigeration system of claim 3 wherein said control means also includes a manually operable switch having one position providing for the automatic actuation of said system in its heating cycle and having a second position providing for the automatic actuation of said system in its cooling cycle.

6. A combination heating and refrigeration system for providing easy change-overs between a heated air distribution balance and a proportionately- and volumetrically-different cooled air distribution balance, comprising a first air handling unit including a blower means, an air heating means of the fluid-fuel burner type, and an air cooling means of the cooling-coil type, a second air handling unit without any air heating means but including a blower means and an air cooling means of the cooling-coil type separate from the said blower means and the said air cooling means associated with said first air handling unit, a single compressor connected to the cooling coils of both said first and second unit cooling means, duct means for distributing the air from said first unit to a plurality of rooms of a building, other duct means for distributing air from said second unit to at least some of the same rooms of said building, said compressor, said first unit heating means and said first and second unit blower and cooling means being adapted for electrical actuation, control means adapted to be located in one of the rooms of said building, said control means including thermostat means having at least one circuit contact actuated at a predetermined temperature level, and electrical circuits associated with said control means and said first and second air handling units and said compressor, said circuits being arranged to actuate said first unit blower and said first unit heating means in response to a temperature fall in relation to said predetermined temperature level without actuating said compressor, said second unit blower means and said first and second unit cooling means, said circuits also being arranged to actuate said compressor, said first unit blower means and cooling means together with said second unit blower and cooling means in response to a temperature rise in relation to said predetermined temperature level without actuating said first unit heating means.

7. A combination heating and refrigeration system for providing easy change-overs between a heated air distribution balance and a proportionately-different cooled air distribution balance, comprising a first air handling unit including a blower means, an air heating means, and an air cooling means, a second air handling unit without any air heating means but including a blower means and an air cooling means separate from the said blower means and the said air cooling means associated with said first air handling unit, duct means for distributing the air from said first unit to a plurality of the rooms of a building, other duct means for distributing the air from said second unit to at least some of the same rooms of said building, control means adapted to be located in one of the rooms of said building, said control means including thermostat means having a circuit-closing contact actuated by a temperature fall to a predetermined level, said contact being open at temperatures above said predetermined level and closed at temperatures below said predetermined level, and electrical circuits associated with said control means and said first and second air handling units, said circuits being arranged to operate said first unit blower and said first unit heating means in the heating cycle in response to the closing of said thermostat contact and to stop the operation thereof on the opening of said contact, said circuits also being arranged to operate said first unit blower means and cooling means together with said second unit blower means and cooling means in the cooling cycle in response to the opening of thermostat contact and to stop the operation thereof on the closing of said contact, said control means also including a manually-operable switch having two positions, one of said switch positions being arranged with respect to said thermostat contact and said electrical circuits so that in said heating cycle the opening and closing of said thermostat contact can occur without actuating said second unit blower means and without operating said first and second unit cooling means, the other of said switch positions being arranged with respect to said thermostat contact and said electrical circuits so that in said cooling cycle the opening and closing of said thermostat contact can occur without operating said first unit heating means.

8. The combination heating and refrigeration system of claim 7 wherein said control means also includes humidistat means, said humidistat means being arranged with respect to said manually-operable switch and said electrical circuits so that when said switch is in said other position for said cooling cycle a rise in humidity to above a predetermined level will operate said first unit blower means and said first unit heating means, thereby permitting said first unit heating means to participate in a dehumidification cycle.

References Cited in the file of this patent

UNITED STATES PATENTS

| | | |
|---|---|---|
| 1,909,164 | Bulkeley | May 16, 1933 |
| 2,023,622 | Textoruis et al. | Dec. 10, 1935 |
| 2,068,080 | Schuyler | Jan. 19, 1937 |
| 2,126,182 | Fillo | Aug. 9, 1938 |
| 2,609,743 | Ashley et al. | Sept. 9, 1952 |
| 2,699,922 | Herbst | Jan. 18, 1955 |